United States Patent [19]

Tunze

[11] 4,187,053
[45] Feb. 5, 1980

[54] CENTRIFUGAL PUMP

[76] Inventor: Norbert Tunze, Seeshaupter Str. 68, 8122 Penzberg, Fed. Rep. of Germany

[21] Appl. No.: 820,283

[22] Filed: Jul. 29, 1977

[30] Foreign Application Priority Data

Jul. 29, 1976 [DE] Fed. Rep. of Germany ... 7623892[U]

[51] Int. Cl.² ............................................... F04B 17/00
[52] U.S. Cl. .............................. 415/111; 308/237 A; 308/238
[58] Field of Search .................. 417/424; 415/111; 308/237 R, 237 A, 238; 416/241 A, 244 R

[56] References Cited

U.S. PATENT DOCUMENTS

| | | | |
|---|---|---|---|
| 1,810,296 | 6/1931 | Sauer | 308/237 A X |
| 2,784,876 | 3/1957 | Parkes | 417/424 |
| 3,055,304 | 9/1962 | Ziegler | 417/424 |
| 3,172,850 | 3/1965 | Englesberg et al. | 417/424 |
| 3,225,930 | 12/1965 | Willinger | 417/424 |
| 3,356,218 | 12/1967 | Grudowski | 417/424 |
| 3,408,944 | 11/1968 | Belonger et al. | 416/241 A |
| 3,417,704 | 12/1968 | Pall et al. | 308/237 X |
| 3,733,151 | 5/1973 | Timmons et al. | 417/424 |
| 3,837,767 | 9/1974 | Aller | 417/424 |

Primary Examiner—Carlton R. Croyle
Assistant Examiner—Edward Look
Attorney, Agent, or Firm—Fred Philpitt

[57] ABSTRACT

The innovation relates to a centrifugal pump, more especially an aquarium centrifugal pump, comprising a motor housing containing an electric motor, and comprising a shaft tube in which a drive shaft for an impeller is arranged, and comprising an impeller housing in which the impeller runs.

8 Claims, 7 Drawing Figures

CENTRIFUGAL PUMP

BACKGROUND

Centrifugal pumps installed in aquaria often run for years day and night. In view of these operating times, it is important, even when smaller pumps are involved, how much electrical power the electric motor uses. Unfavourable ratios of friction in the transmission of power between the electric motor and the impeller can impair the efficiency of a pump to such an extent that a greater electrical power input is required for the same delivery.

Friction in the drive not only impairs the efficiency of the pump but also reduces its life. This is of special importance for a unit which is in continuous operation. In addition, friction increases the noise level produced by the pump. However, it is imperative that aquarium pumps, which are often operated in inhabited places, should run with a maximum of silence.

It follows that a maximum of attention must be given to the moving parts of such centrifugal pumps. On the other hand, for reasons of cost, it should be possible to manufacture the pump to a considerable extent from plastics material and by the injection-moulding process. Finally, it must be easy to assemble the individual parts and just as easy to take them apart for maintenance or cleaning purposes.

THE PRESENT INVENTION

It is the object of the present innovation to devise a mechanical construction for a centrifugal pump which ensures a minimum of frictional losses and a maximum of silent running and which can also be brought about to a far-reaching extent by means of injection-moulding and allows easy assembly and disassembly.

According to the present invention, this problem is solved in that there is provided a bearing flange whose circumferential surface is connectible to the shaft tube and whose bottom surface is connectible to the impeller housing and whose top surface is provided with a bearing surface for the drive shaft.

The invention will be explained in detail with the aid of some exemplified embodiments and with reference to the drawings, in which:

FIG. 3b shows a side view of the bearing flange, partially in section along the line B—B shown in FIG. 3a;

Figure 2:
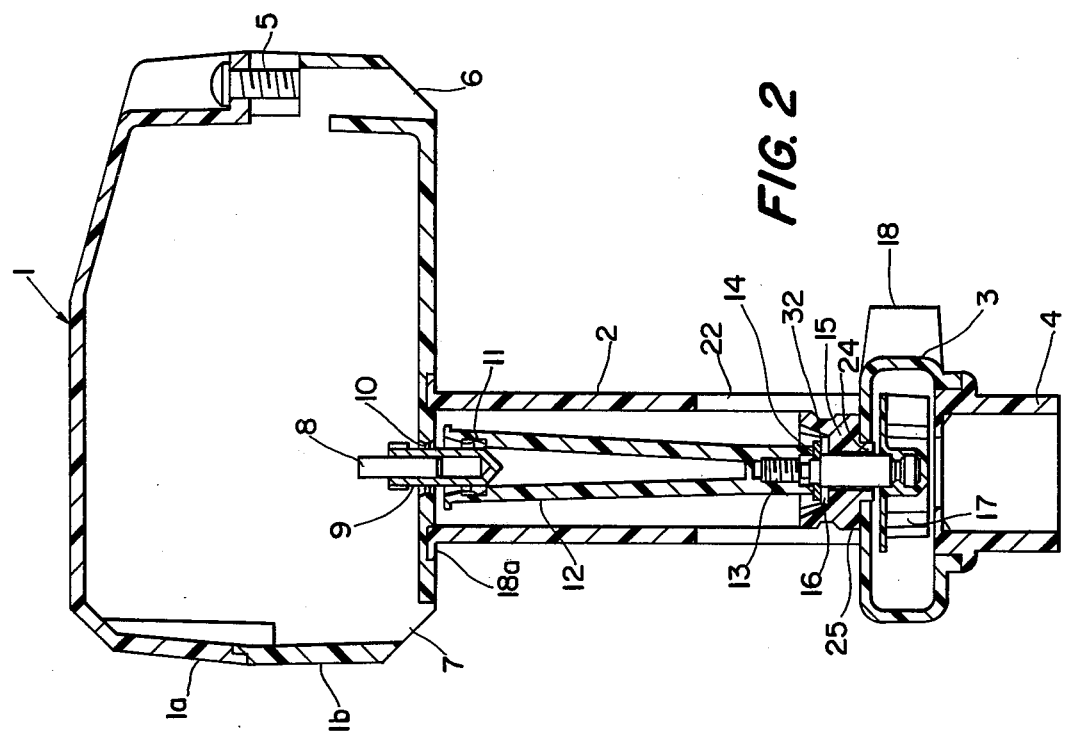
FIG. 2 shows a section along the line A—A shown in FIG. 1.
Figure 1:
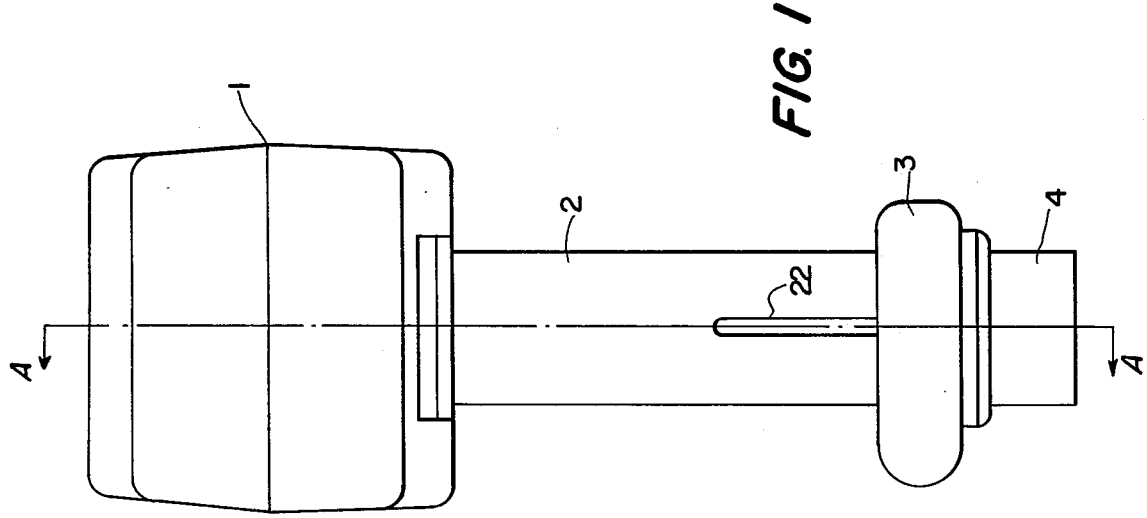
FIG. 1 shows a front view of the centrifugal pump housing.
Figure 3A:
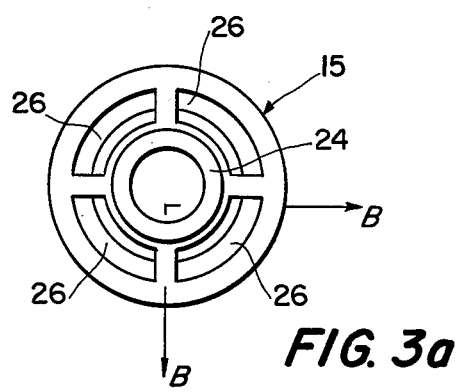
FIG. 3a shows a view of the bearing flange underside.
Figure 3B:
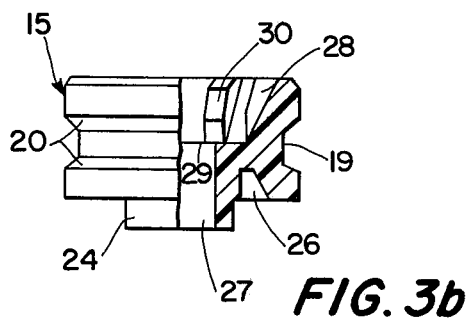
Figure 3C:
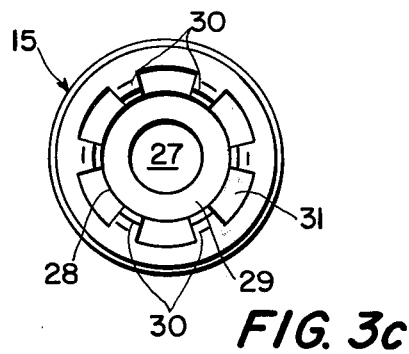
FIG. 3c shows a view of the bearing flange top.
Figure 4:
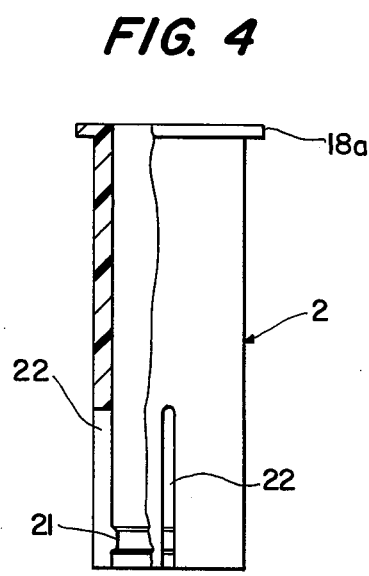
FIG. 4 shows a side of the shaft tube, partially in section.

The scale of FIGS. 3a to 3c and 5 is double that of FIGS. 1, 2 and 4.

As can be seen in FIGS. 1 and 2, the centrifugal pump comprises an upper motor housing 1 to which a downwardly directed shaft tube 2 is joined. This tube is secured at its open lower end to the impeller housing 3 in a manner yet to be described. A suction socket 4 is screwed into the impeller housing underside.

Unless otherwise stated, all parts of the centrifugal pump housing are made of plastics material and by the injection-moulding method.

The motor housing 1 comprises an upper part 1a and a lower part 1b, which are held together by the screw 5. The electric motor (not shown), which is accommodated in the motor housing together with the necessary holders and electrical fittings, is cooled by means of air vents 6, 7 in the lower part 1b.

Shown, however, is the downwardly directed motor shaft 8, over which a drive pinion 9 is placed from the outside through a bottom aperture 10 in the motor housing part 1b. In order to ensure quiet running, low friction and long life, the pinion 9 is preferably made of nylon and provided with a silicone coating.

The teeth of the pinion 9 engage in a complementary internal toothing 11 of a hollow shaft 12 adjoining at the bottom. At its lower end, the hollow shaft 12 is provided with an internal thread 13, into which the (preferably metallic) impeller arbour 14 is screwed. The impeller arbour 14 extends downwards towards the impeller 17, into which it may be injection-moulded, through the bearing arrangement still to be described and consisting of the bearing flange 15 and the antifriction thrust bearing 16.

The impeller 17 is thus driven by the electric motor through the shaft 8, the pinion 9, the hollow shaft 12 and the impeller arbour 14. During its rotation, it sucks in water from the bottom through the socket 4, the water being ejected through the port 18 in the impeller housing 3.

By an upper flange 18a, the shaft tube 2 is secured, for example glued or welded, to the lower part 1b of the motor housing 1. At its lower end, the tube is connected to the bearing flange 15 in a manner still to be described.

The bearing flange 15, which is shown in more detail in FIGS. 3a to 3c, fulfils several functions: On the one hand, it connects the shaft tube 2 to the impeller housing 3; on the other hand, it supports the hollow shaft 12 together with the screwed-in impeller arbour 14.

The shaft tube 2 is preferably secured to the bearing flange 15 by means of an easily disengageable detent connection. To this end, the circumferential surface of the bearing flange 15 is provided with an arresting groove 19 expediently comprising bevelled walls 20.

The arresting groove 19 co-operates with a complementary annular projection 21 (FIG. 4) at the lower internal end of the shaft tube 2. Cross slots 22 at the lower end of the shaft tube and the elasticity of the plastics material allow the interlocking of the annular projection 21 on the shaft tube 2 and of the arresting groove 19 on the bearing flange 15.

Due to the inclined walls 20 of the arresting groove 19, an axial pressure or pull generally suffices to close or open the interlock.

Figure 5:
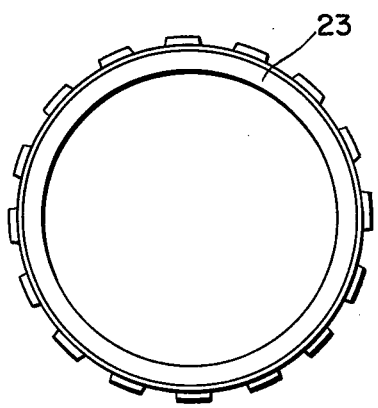
FIG. 5 shows a top view of the clamping ring which is pushed over the shaft tube for locking purposes.

In order to prevent an unintentional opening of the interlock, the clamping ring 23 shown in FIG. 5 may be pushed over the lower end of the shaft tube 2. The clamping ring 23 is not shown in FIGS. 1 and 2.

The connection between the bearing flange 15 and the impeller housing 3 is effected via a press plug-in connection. To this end, there is provided on the underside of the bearing flange 15 (FIGS. 3a and 3b) a cylindrical lug 24 which extends into a central aperture 25 in the upper wall of the impeller housing 3 and centres the bearing flange 15.

Furthermore provided in the underside of the bearing flange 15 are reception apertures 26, into which complementary projections on the impeller housing 3 can be pressed. The reception apertures 26 do not form a completely closed circle, so as to ensure that the bearing flange cannot be rotated in relation to the impeller housing 3.

A radial centre bore 27 in the bearing flange 15 receives the impeller arbour 14 and opens towards the top to form a widening 28. At the step between the widening 28 and the bore 27, there is formed an annular flat bearing surface 29. On this latter rests, as shown in FIG. 2, an antifriction thrust bearing 16 which is preferably made of PTFE (teflon). The hollow shaft 12 rests against the antifriction thrust bearing 16 from the top via a spacer 32, which is preferably made of high-quality steel.

In order to prevent the antifriction thrust bearing 16 from rotating relative to the bearing flange 15, two measures are provided: On the one hand, the bearing surface 29 is roughened. On the other hand, radial holding jaws 30, which rest against the circumferential surface of the antifriction thrust bearing 16, project towards the inside from the body of the bearing flange 15 in the widening 28. Clearances 31 are left between the holding jaws 30. These provide the possibility of removing the antifriction thrust bearing 16 from the bearing flange 15 by means of a screw-driver or a similar tool.

The bearing provided in this manner is simultaneously a shaft guideway, a thrust bearing and a seal. The total arrangement is such that the parts can be manufactured by injection-moulding, be easily assembled and disassembled and that a low-noise and low-friction operation of the pump is ensured.

I claim:
1. The combination which includes
(a) a motor housing 1,
(b) an impeller housing 3 containing an impeller 17,
(c) a hollow shaft tube 2 extending downwardly from said motor housing 1 to the upper surface of said impeller housing 3, said shaft tube having an annular inward projection on its lower interior surface,
(d) a drive shaft 12 extending centrally down through said hollow shaft tube 2,
(e) a metallic impeller arbour 14 having its upper end connected to the lower end of drive shaft 12 its lower end connected to said impeller 17, and an intermediate portion extending downwardly through said impeller housing 3,
(f) a bearing flange 15,
  (1) having a central inner opening surrounding the said intermediate portion of said metallic impeller arbour 14,
  (2) having an outer circumferential surface that is press fitted against the inner side surfaces of the lower end of said shaft tube 2, said outer circumferential surface having an arresting groove that engages said annular inward projection on the lower interior surface of said shaft tube 2,
  (3) having an under side that is press fitted into the upper surface of said impeller housing 3, and
(g) an antifriction thrust bearing 16 and a steel spacer 32 extending between the lower end of said drive shaft 12 and a portion of the upper surface of said bearing flange 15 whereby one lower face of the drive shaft 12 rests downwardly against said spacer which in turn rests against said antifriction thrust bearing.

2. The combination of claim 1 wherein the lower end of said shaft tube 2 contains elongated slots 22 parallel to the axis of the tube 2.

3. The combination of claim 1 wherein the underside of said bearing flange 15 has a central cylindrical lug 24 which projects into a central aperture in the upper wall of said impeller housing 3.

4. The combination of claim 1 wherein the lower end of said hollow shaft 12 is provided with an internal thread into which said impeller arbour 14 is screwed.

5. The combination of claim 1 wherein the lower end of said impeller arbour 14 is injection-moulded into the center of the impeller 17.

6. The combination which includes
(a) a motor housing 1,
(b) an impeller housing 3 containing an impeller 17,
(c) a hollow shaft tube 2 extending downwardly from said motor housing 1 to the upper surface of said impeller housing 3,
(d) a drive shaft 12 extending centrally down through said hollow shaft tube 2,
(e) a metallic impeller arbour 14 having its upper end connected to the lower end of drive shaft 12 its lower end connected to said impeller 17, and an intermediate portion extending downwardly through said impeller housing 3,
(f) a bearing flange 15,
  (1) having a central inner opening surrounding the said intermediate portion of said metallic impeller arbour 14,
  (2) having an outer circumferential surface that is press fitted against the inner side surfaces of the lower end of said shaft tube 2,
  (3) having an under side that is press fitted into the upper surface of said impeller housing 3, and
(g) an antifriction thrust bearing 16 and a steel spacer 32 extending between the lower end of said drive shaft 12 and a portion of the upper surface of said bearing flange 15 whereby one lower face of the drive shaft 12 rests downwardly against said spacer, which in turn rests against said antifriction thrust bearing, the bearing flange 15 being provided with widening radial holding jaws 30 which are inwardly directed from the circumference of the bearing flange 15 and which touch the circumferential surface of the antifriction thrust bearing 16.

7. The combination of claim 6 wherein the contact surfaces of the holding jaws 30 are knurled.

8. The combination of claim 7 wherein clearances are provided between the holding jaws 30.

* * * * *